N. A. T. N. FEARY.
SPRING FASTENING DEVICE.
APPLICATION FILED AUG. 29, 1916.
1,227,411.
Patented May 22, 1917.
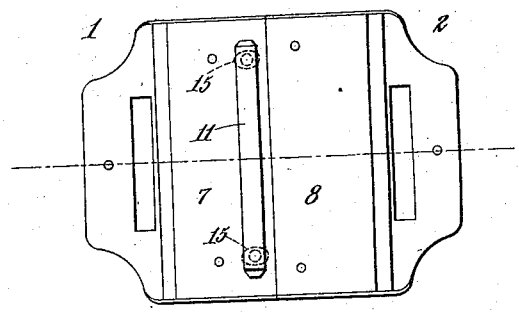
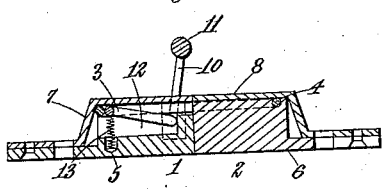
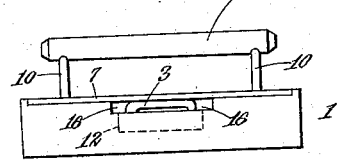
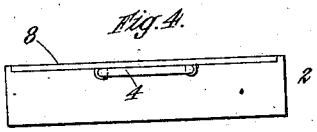
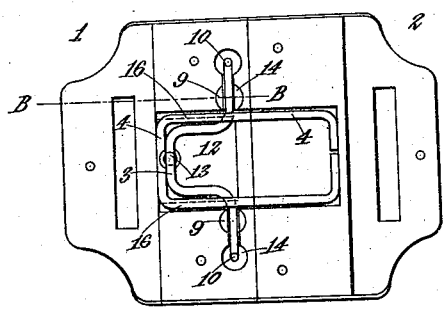
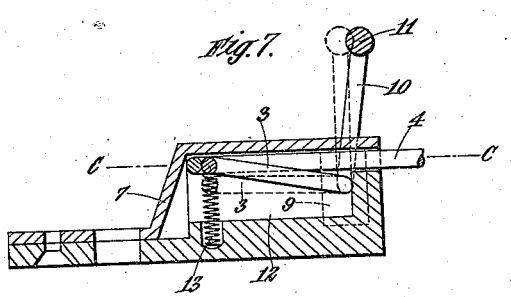
Inventor.

UNITED STATES PATENT OFFICE.

NEVILLE ALEXANDER THOMAS NIX FEARY, OF PETERBOROUGH, ENGLAND, ASSIGNOR TO FREDERICK SAGE & COMPANY, LIMITED, OF LONDON, ENGLAND.

SPRING FASTENING DEVICE.

1,227,411.  Specification of Letters Patent.  Patented May 22, 1917.

Application filed August 29, 1916. Serial No. 117,418.

*To all whom it may concern:*

Be it known that I, NEVILLE ALEXANDER THOMAS NIX FEARY, a subject of the King of Great Britain, residing at No. 17 Paston Lane, Walton, Peterborough, in the county of Northants, England, have invented certain new and useful Improvements in or Relating to Spring Fastening Devices, of which the following is a specification.

The said invention relates to spring fastening devices of the kind consisting of two main portions which are respectively secured to two parts or articles or members to be temporarily fastened together and are operated automatically in their fastening action by bringing one portion of the fastening into a certain position relatively to the other portion and are released to unfasten the said parts, articles or members by operating on the spring of the fastening. The main object of the said invention is to provide for easy and very rapid release of the two portions of the fastening for unfastening from one another the two parts, articles or members to which they are respectively secured and at the same time to provide for great security and certainty in the fastening function of the device.

According to the said invention the engaging members of the two portions of the fastening device both have convexedly rounded or curved surfaces (preferably cylindrical) and are so constructed and arranged that after one engaging member has in the fastening operation been caused to pass over or beyond the other engaging member the rounded or curved surfaces of the said engaging members abut against one another in such manner that the line of direction of the usual pulling strain to which fastening devices of the aforesaid kind are subject when in use is along the normal to the line or point of contact of the two convexedly curved surfaces, that is, in the case of radial curves through the geometrical centers of both the curved surfaces and also through the line or point at which they contact with one another. Means are provided whereby when it be desired to disengage the two portions of the device one of the engaging members is caused to move slightly so that the line of direction of pulling strain is no longer along the normal of the curved surfaces where they contact with one another whereupon a very slight separating pull enables the two portions of the device to be separated.

The said invention is hereinafter particularly described with reference to the accompanying drawings as embodied in a fastening device for safety belts for use by aviators to which the invention is particularly applicable.

Figure 1 of the said drawings is a face view of the device its two engaging portions being engaged together.

Fig. 2 is a sectional view taken on the line A A Fig. 1.

Figs. 3 and 4 are views of those edges of the said two portions respectively that abut when they are engaged together.

Fig. 5 is a face view of the device similar to Fig. 1 with the cover plates and handle hereinafter referred to removed but showing the engaging members hereinafter described in the engaged positions they would be in if the said cover plates were in place.

Fig. 6 is a part sectional view taken on the line B B Fig. 5.

Fig. 7 is a part sectional view similar to the left hand portion of the view Fig. 2 but on a larger scale.

In the following description the parts of the said figures are referred to by the numerals marked thereon the same reference numerals indicating the same parts in all the said figures.

1, 2 are the two separable and engaging portions of the device which are respectively secured to the two ends of the safety belt or strap and 3, 4 are the two engaging members of the fastening device one being secured in one of the said portions and the other engaging member being secured in the other portion. Each of the portions 1, 2 consists of a foundation body or base that of the portion 1 being marked 5 and that of the portion 2 being marked 6 and each of the bases 5, 6 has a cover plate secured to it by screws that of the portion 1 being marked 7 and that of the portion 2 being marked 8. Both of the engaging members 3, 4 are made of steel cylindrical wire bent to the needed shape. The engaging member 4 is of rectangular form and tightly secured in a groove of double crank shape in the base 6 by means of the cover plate 8, leaving a bow or double crank shaped portion of the member 4 protruding from the portion 2. The member 3 is of double crank or bow form at its middle part and its uncranked part is mounted in bearings and grooves in the base 5 of the portion 1, the said bearings being formed in gun metal plugs 9, 9 secured friction tight in holes in the said base. The end portions of the uncranked parts of the engaging member 3 are bent out from the plane of its bow at 10, 10 and on their ends a handle 11 is secured. The bow of the engaging member 3 is situated in a recess 12 in the base 5 so as to be free to have angular movement therein and a coiled spring 13 is disposed between the said bow and the base 5 so as normally to press the outer part of the said bow resiliently against the inner surface of the cover 7 to the said base. The spring 13 is kept in place by one of its ends being disposed in a recess in the base 5 and the other end being secured to the bow of the member 3 as for instance by the end being passed into a hole in the said bow. Clearance recesses 14, 14 in the base 5 and slots 15, 15 in the cover 7 are provided to enable the member 3 to be angularly moved so far as the recess 12 and the spring 13 will allow, to and from the cover 7. At the part near the cover 7 the recess 12 is enlarged at 16 symmetrically in relation to the bow of the member 3 and continued to that edge of the base 5 which meets the corresponding edge of the portion 2 and this enlargement is of such shape and size that the member 4 can pass into it by an easy working fit without material play when the portions 1, 2 are brought together for engagement as shown in Fig. 1. The said enlargement thus with the cover 7 constitutes a true guide 16 for the member 4 in its engaging movement. The bow of the member 4 is a little wider than the bow of the member 3 and of such length that when the members are engaged and the portions 1, 2 cannot be brought closer together edge to edge the bow of the member 3 is within the bow of the member 4 and the outer surface of the former makes contact with the inner surface of the latter. When the portions 1, 2 are brought together for engagement the member 4 is caused to enter and slide in the guide 16 in doing which its extremity meets the bow of the member 3 depressing it against the action of the spring 13 and passing over it. When the end part of the bow of the member 4 has passed beyond the end part of the bow of the member 3 the latter is returned by the action of its spring 13 to its position against the inside of the cover 7 and immediately this has occurred the movement of the member 4 is arrested by reason of the portions 1, 2 meeting. As the engaging parts of both the members 3, 4 are circular and of the same diameter, abut against the same plane surface and this is parallel to the direction of pulling disengaging strain on the portions 1, 2 of the fastening device, the line of direction of the said strain passes through both axes of the abutting convex cylindrical portions of the members and through their line of contact as indicated by the line C C Fig. 7 which figure best illustrates these parts. As the spring 13 keeps the bow of the memeber 3 against the inner side of the cover 7 and the bow of the member 4 when in the engaged position cannot move away from the said cover 7 by reason of the provisions made for guiding that member into the portion 1 when the parts are being engaged, there is no possibility of the members 3, 4 being disengaged without manipulation as hereinafter described however great the saparating pull on the portions 1, 2. If however the handle be given a very slight movement to the left to turn the member 3 slightly in its bearings and cause the bow of that member to move away slightly from the cover 7 the relationship that previously had prevented disengagement of the members 3, 4 by a pulling strain is disturbed. The axis of the cylindrical outer part of the bow of the member 3 not now being in the line of direction of pulling strain on the portions 1, 2 that strain causes the member 4 to move the bow of the member 3 farther away from the cover 7 against the action of the spring 13 and eventually to pass by it thus releasing the portions 1, 2 the one from the other. The position of the member 3 when the member 4 is passing between it and the cover 7 either in the engaging or disengaging movement is well illustrated by the broken lines in Fig. 7. It will be appreciated that the slightest movement of the end of the bow of the member 3 away from the cover 7 initiates disengagement of the members 3, 4.

Although the said invention is hereinbefore described and illustrated in the accompanying drawings as conveniently embodied in a fastening device for safety belts for use by aviators it may readily be embodied in spring fastening devices for other purposes and further although in the said embodiment the two engaging members are provided with cylindrical abutting or working surfaces yet those surfaces need not be cylindrcial but may be merely convexedly curved or rounded at those parts that abut against one another and adjacently thereto. Further those surfaces need not have the shape of a radial or even symmetrical curve in cross section but may for instance be elliptical; moreover the convexedly curved or rounded surfaces need not contact along a line as for instance when cylindrical, but may for example be spherical. The said invention is based upon the principle that when two convexedly curved surfaces on two parts are pressed together so that the line of force pressing them together passes through the point or line at or along which they contact and that they make contact in such a way that the normals of the curves at the point or line of contact in cross section are in line, the said two curved parts cannot be disengaged by that pressure or any increase thereof but immediately such relationship is disturbed to a very small degree by moving one of those surfaces the said pressure immediately acts to cause one of the surfaces to pass over the other. The said invention therefore affords an exceedingly quick release for spring fastening devices and is thus particularly applicable to fastening devices for such articles as aviators' safety belts, with which it is essential that release should be effected with a minimum of manipulating movement. If desired to increase the ease of engagement and disengagement, the friction between the two curved surfaces may be reduced by using parts circular in cross section such as cylinders, spheres or paraboloids (when used so that their major axes are parallel) mounted on axes parallel to each other so that in the engaging and disengaging movements the curved surfaces roll over each other.

It must be understood that the handle or means whereby the releasing movement is initiated and controlled may be varied considerably without departing from the nature of the said invention.

What we claim and desire to secure by Letters Patent of the United States is:—

1. A separable fastening device comprising engaging members having convexly curved surfaces constructed and arranged to abut against each other so that they have a common tangent whereby when the separating strain is normal to said tangent it will be ineffective to separate the members.

2. A separable fastening device comprising engaging members having convexly curved surfaces constructed and arranged to abut against each other so that they have a common tangent whereby when the separating strain is normal to said tangent it will be ineffective to separate the members, means for normally retaining said members in such position, and means for temporarily disturbing the positions of said members.

3. A separable fastening device comprising engaging members having convexly curved surfaces, an abutment, a spring tending to press one of said members against said abutment, the other of said members being adapted to be located against said abutment with its curved surface engaging the curved surface of the first-mentioned member so that said surfaces have a common tangent whereby when the separating strain is normal to said tangent it will be ineffective to separate the members, and means whereby the spring-controlled member may be moved away from its abutment to release the members.

4. A separable fastening device comprising a pair of separable elements, an engaging member rigidly secured to one of said elements, a movable engaging member in a cavity in the other of said elements, said members having convexly curved surfaces, an abutment, a spring tending to press said movable member against said abutment, said cavity having a passage extending therefrom, which passage is of such shape and size as to receive and guide the engaging member on the other element of the device so that the rigidly mounted engaging member may pass between the abutment and the spring-controlled member and lie on the farther side thereof against the abutment and with the curved surfaces of the members in contact so that they have a common tangent whereby when the separating strain is normal to the tangent it will be ineffective to separate the members, and means whereby the movable member may be moved from its abutment to such position that a separating force on the members will cause the rigid member to move the movable member farther away from the abutment.

5. A separable fastening device comprising engaging members which are circular in cross section and constructed and arranged to have their curved faces contact with each other so that they will have a common tangent whereby when the separating strain is normal to the tangent it will be ineffective to separate the members, means for normally retaining said members in such position, and means for temporarily disturbing the position of such members to effect release.

6. A separable fastening device comprising engaging members of cylindrical form at their bearing parts, said members being adapted to have their cylindrical portions engage each other so that the axes of such portions will be substantially parallel whereby when the separating strain is exerted in a plane common to said axes it will be ineffective to separate the members, means for normally retaining said members in such positions, and means for temporarily disturbing the positions of said members to effect release.

7. A separable fastening device comprising engaging members having cylindrical engaging faces, an abutment member against which the engaging members abut, said engaging faces, when the engaging members are in engagement with the abutment member, having a common tangent whereby when the separating strain is normal to the tangent it will be ineffective to separate the members, and means for temporarily moving one of the members away from the abutment to disturb the relationship of the members.

8. A fastening device of the kind hereinbefore referred to comprising a bow shaped engaging member of cylindrical wire rigidly secured in one portion and an engaging member of cylindrical wire and double crank form mounted to turn in the other portion, the outside width of the bow of the double cranked engaging member being less than the outside width of the bow of the other engaging member, a cavity in last mentioned portion in which the bow of the double crank shaped engaging member is located, a passage from said portion of the device in which it is situated said passage being of such shape and size that the engaging member on the other portion of the device may have a sliding fit therein, a plane surface forming one side of said cavity and passage, a spring tending to force the outer part of the bow of the double crank shaped engaging member against said plane surface and an outside handle on the spring controlled engaging member whereby it may be moved away from said plane surface.

NEVILLE ALEXANDER THOMAS NIX FEARY.

Copies of this patent may be obtained for five cents each, by addressing the "Commissioner of Patents, Washington, D. C."